United States Patent
Rosenbaum et al.

(10) Patent No.: US 7,144,634 B2
(45) Date of Patent: Dec. 5, 2006

(54) POLYLACTIC ACID (PLA) FILM HAVING GOOD ANTISTATIC PROPERTIES

(75) Inventors: Sonja Rosenbaum, deceased, late of Bous (DE); by Marlies Rosenbaum, legal representative, Bous (DE); by Manfred Rosenbaum, legal representative, Bous (DE); Petra Hade, Saarbrücken (DE); Detlef D. Busch, Saarlouis (DE)

(73) Assignee: Treofan Germany GmbH & Co. KG (DE)

( * ) Notice: Subject to any disclaimer, the term of this patent is extended or adjusted under 35 U.S.C. 154(b) by 0 days.

(21) Appl. No.: 10/476,335

(22) PCT Filed: Apr. 19, 2002

(86) PCT No.: PCT/EP02/04325

§ 371 (c)(1),
(2), (4) Date: Mar. 29, 2004

(87) PCT Pub. No.: WO02/087877

PCT Pub. Date: Nov. 7, 2002

(65) Prior Publication Data

US 2004/0161622 A1    Aug. 19, 2004

(30) Foreign Application Priority Data

Apr. 30, 2001    (DE) ................... 101 21 153

(51) Int. Cl.
*B32B 27/08*    (2006.01)
*B32B 27/18*    (2006.01)
*B32B 27/20*    (2006.01)
*B32B 27/36*    (2006.01)

(52) U.S. Cl. ............ 428/480; 428/483; 428/910; 428/334; 428/335; 428/336; 428/500; 525/165; 525/177; 524/300; 524/315; 524/318; 524/322

(58) Field of Classification Search ............ 428/910, 428/480, 213, 215, 334, 336; 528/354; 524/300, 524/315, 318, 317, 322

See application file for complete search history.

(56) References Cited

U.S. PATENT DOCUMENTS

| 5,403,897 | A | * | 4/1995 | Ebato et al. ............ 525/444 |
| 5,677,055 | A | * | 10/1997 | Ohkawachi et al. ......... 428/357 |
| 5,766,748 | A | * | 6/1998 | Ikado et al. ............. 428/220 |
| 6,153,276 | A | * | 11/2000 | Oya et al. .............. 428/35.2 |
| 6,353,086 | B1 | * | 3/2002 | Kolstad et al. ........... 528/354 |
| 6,462,105 | B1 | * | 10/2002 | Kuroki et al. ........... 523/351 |
| 6,713,175 | B1 | * | 3/2004 | Terada et al. ............ 428/349 |
| 6,720,374 | B1 | * | 4/2004 | Sashida et al. ........... 524/310 |
| 6,815,079 | B1 | * | 11/2004 | Rosenbaum et al. ........ 428/480 |

FOREIGN PATENT DOCUMENTS

| EP | 0 492 463 | | 7/1992 |
| EP | 0 802 219 | | 10/1997 |
| JP | 05-009319 | * | 1/1993 |
| JP | 10-036650 | * | 2/1998 |
| JP | 2002-114900 | * | 4/2002 |

* cited by examiner

*Primary Examiner*—Vivian Chen
(74) *Attorney, Agent, or Firm*—Connolly Bove Lodge & Hutz

(57) ABSTRACT

The invention relates to a multilayer biaxially oriented film comprised of a base layer and of at least one cover layer. The cover layer contains at least one polymer, which is made from at least one hydroxycarboxylic acid, and contains 2 to 10 wt. % of a glycerol fatty acid ester.

18 Claims, No Drawings

POLYLACTIC ACID (PLA) FILM HAVING GOOD ANTISTATIC PROPERTIES

The present invention relates to a biaxially oriented film which includes at least one layer comprising at least one polymer made from at least one hydroxycarboxylic acid and glycerol fatty acid esters. The invention furthermore relates to a process for the production of the film and to the use thereof.

Films made from thermoplastics are widely employed for the packaging of foods and other goods. For these uses, it is essential that the films have good antistatic and sliding-friction properties.

The object of the present invention was to provide films for environmentally friendly packaging which can be produced from renewable raw materials, can be disposed of in an environmentally friendly manner and have good antistatic properties. In addition, good sliding properties and a low coefficient of friction are desirable. For certain areas of application, good transparency and high gloss values are additionally necessary.

The object is achieved by a transparent, biaxially oriented film having at least one top layer whose characterizing features consist in that the top layer comprises at least one polymer I made from at least one hydroxy-carboxylic acid and glycerol fatty acid esters in a concentration of from >2 to 10% by weight, based on the top layer.

In accordance with the invention, the proportion of glycerol fatty acid esters, preferably glycerol monostearic acid esters (GMAs), in the top layer is greater than 2% by weight, based on the weight of the top layer, in order to achieve good antistatic properties. If, on the other hand, the glycerol fatty acid ester (referred to as GFA below) content is greater than 10% by weight, an adverse effect arises on the optical properties of the film without a further improving action on the antistatic properties being achieved. It has been found that the incorporation of GFA into the top layer is essential for the antistatic properties of the film. Surprisingly, the incorporation of the same component into the base layer made from PHC raw materials does not detectably improve the antistatic properties of the film. It is therefore preferred not to add any glycerol fatty acid esters to the base layer, even though small amounts, for example via added regrind, have no interfering effect. It is assumed that migration processes, as are known from comparable polyolefinic films, such as, for example, polypropylene or polyethylene films, do not occur in a PLA film. This conclusion is also supported by investigations on films having comparatively low GFA contents in the top layer. Even in such embodiments which are not according to the invention, it has not been possible to observe any effect of GFA on the antistatic properties of the film.

In addition, a number of antistatics have been investigated, some of which are employed in known polyester films made from aromatic polyesters, such as, for example, polyethylene terephthalate films, or alternatively in polyolefin films. It has been found here that this teaching cannot be applied to PLA films. This is presumably connected with the different raw material properties and the different migration behaviour. Surprisingly, GFA exhibits the desired effect in a top layer comprising a polymer made from at least one hydroxycarboxylic acid at comparatively high concentrations of at least 2% by weight, although other known antistatics have proven totally unsuitable.

Suitable antistatics are glycerol fatty acid esters in which one, two or all three alcohol functions have been esterified by means of a fatty acid. Preference is given to monoesters in which only one alcohol group of the glycerol has been esterified by means of a fatty acid, so-called glycerol monofatty acid esters. Suitable fatty acids of these compounds have a chain length of from 12 to 20 carbon atoms. Preference is given to stearic acid, lauric acid or oleic acid. Glycerol monostearate (GMA) has proven particularly advantageous.

The preferred concentration of glycerol fatty acid esters, preferably GMA, is from 2.0 to 8% by weight, in particular 3–6% by weight, in the top layer.

The thickness of the top layer is generally in the range from 0.5 to 10 μm, preferably from 1 to 8 μm, in particular from 2 to 6 μm.

The top layer with an antistatic finish comprises from 80 to <98% by weight, preferably from 85 to <98% by weight, of a polymer made from at least one hydroxycarboxylic acid, referred to as PHC (polyhydroxy-carboxylic acids) below. These are taken to mean homopolymers or copolymers built up from polymerized units of preferably aliphatic hydroxycarboxylic acids. Of the PHCs which are suitable for the present invention, polylactic acids are particularly suitable. These are referred to as PLA (polylactide acid) below. Here too, the term PLA is taken to mean both homopolymers built up only from lactic acid units and copolymers comprising predominantly lactic acid units (>50%) in combination with other aliphatic hydroxylactic acid units.

Suitable monomers of aliphatic polyhydroxycarboxylic acid (PHC) are, in particular, aliphatic mono-, di- or trihydroxycarboxylic acids and dimeric cyclic esters thereof, of which lactic acid in its D or L form is preferred. A suitable PLA is, for example, polylactic acid from Cargill Dow (Nature-Works®). The preparation of polylactic acid is known from the prior art and is carried out via catalytic ring-opening polymerization of lactide (1,4-dioxane-3,6-dimethyl-2,5-dione), the dimeric cyclic ester of lactic acid, for which reason PLA is also frequently known as polylactide. The preparation of PLA has been described in the following publications: U.S. Pat. No. 5,208,297, U.S. Pat. No. 5,247,058 or U.S. Pat. No. 5,357,035.

Polylactic acids built up exclusively from lactic acid units are suitable. Of these, particular preference is given to PLA homopolymers comprising 80–100% by weight of L-lactic acid units, corresponding to from 0 to 20% by weight of D-lactic acid units. In order to reduce the crystallinity, even higher concentrations of D-lactic acid units may also be present as comonomer. If desired, the polylactic acid may additionally comprise aliphatic polyhydroxycarboxylic acid units other than lactic acid as comonomer, for example glycolic acid units, 3-hydroxypropanoic acid units, 2,2-dimethyl-3-hydroxypropanoic acid units or higher homologues of the hydroxycarboxylic acids having up to 5 carbon atoms.

Preference is given to lactic acid polymers (PLAs) having a melting point of from 110 to 170° C., preferably from 125 to 165° C., and a melt flow index (measurement DIN 53 735 at a load of 2.16 N and 190° C.) of from 1 to 50 g/10 min, preferably from 1 to 30 g/10 min. The molecular weight of the PLA is in the range of from at least 10,000 to 500,000 (number average), preferably from 50,000 to 300,000 (number average). The glass transition temperature Tg is in the range from 40 to 100° C., preferably from 40 to 80° C.

The film according to the invention has a multilayer structure and includes at least the base layer and a top layer made from PHC and glycerol fatty acid esters and having an antistatic finish. If desired, a further top layer may be applied to the opposite side of the film, where this top layer may likewise be treated with GFA antistatic agent or may be untreated. It is furthermore possible additionally to incorporate interlayers on one or both sides between the base layer and the top layer(s), giving four- or five-layer films.

For the purposes of the present invention, the base layer is the layer which has the greatest layer thickness and generally makes up from more than 40% to 98%, preferably from 50 to 90%, of the total film thickness. The top layers are the layers which form the outer layers of the film. Interlayers are of course incorporated between the base layer and the top layers.

For the purposes of the present invention, transparent films are taken to mean films whose light transmission in accordance with ASTM-D 1003-77 is greater than 95%, preferably greater than 75%. It has been found that incorporation of the high concentrations of GFA into the top layer does not increase the haze of the film. Likewise in this respect, the selection of GFA as antistatic finish in the top layer has proven surprisingly advantageous.

The base layer of the film generally comprises at least from 90 to <100% by weight, preferably from 95 to 99% by weight, based on the weight of the layer, of polymers made from at least one hydroxycarboxylic acid, referred to as PHC (polyhydroxycarboxylic acids) below. These are taken to mean homopolymers or copolymers built up from polymerized units of preferably aliphatic hydroxycarboxylic acids. Of the PHCs which are suitable for the base layer, polylactic acids are particularly suitable, including both homopolymers built up only from lactic acid units and copolymers comprising predominantly lactic acid units (>50%) in combination with other aliphatic hydroxylactic acid units.

Suitable monomers of aliphatic polyhydroxycarboxylic acid (PHC) are, in particular, aliphatic mono-, di- or trihydroxycarboxylic acids and dimeric cyclic esters thereof, of which lactic acid in its D or L form is preferred. A suitable PLA is, for example, polylactic acid from Cargill Dow (Nature-Works®). The preparation of polylactic acid is known from the prior art and is carried out via catalytic ring-opening polymerization of lactide (1,4-dioxane-3,6-dimethyl-2,5-dione), the dimeric cyclic ester of lactic acid, for which reason PLA is also frequently known as polylactide. The preparation of PLA has been described in the following publications: U.S. Pat. No. 5,208,297, U.S. Pat. No. 5,247,058 or U.S. Pat. No. 5,357,035.

Preference is given to polylactic acids built up exclusively from lactic acid units. Of these, particular preference is given to PLA homopolymers comprising 80–100% by weight of L-lactic acid units, corresponding to from 0 to 20% by weight of D-lactic acid units. In order to reduce the crystallinity, even higher concentrations of D-lactic acid units may also be present as comonomer. If desired, the polylactic acid may additionally comprise aliphatic polyhydroxycarboxylic acid units other than lactic acid as comonomer, for example glycolic acid units, 3-hydroxypropanoic acid units, 2,2-dimethyl-3-hydroxypropanoic acid units or higher homologues of the hydroxycarboxylic acids having up to 5 carbon atoms.

Preference is given to lactic acid polymers (PLAS) having a melting point of from 110 to 170° C., preferably from 125 to 165° C., and a melt flow index (measurement DIN 53 735 at a load of 2.16 N and 190° C.) of from 1 to 50 g/10 min, preferably from 1 to 30 g/10 min. The molecular weight of the PLA is in the range of from at least 10,000 to 500,000 (number average), preferably from 50,000 to 300,000 (number average). The glass transition temperature Tg is in the range from 40 to 100° C., preferably from 40 to 80° C.

The base layer and the other layers of the film, including the top layer with an antistatic finish, may additionally comprise conventional additives, such as neutralizers, stabilizers, antiblocking agents, lubricants and fillers. They are advantageously added to the polymer or the polymer mixture even before melting. As stabilizers, use is made, for example, of phosphorus compounds, such as phosphoric acid or phosphoric acid esters.

Typical antiblocking agents are inorganic and/or organic particles, for example calcium carbonate, amorphous silicic acid, talc, magnesium carbonate, barium carbonate, calcium sulphate, barium sulphate, lithium phosphate, calcium phosphate, magnesium phosphate, aluminium oxide, titanium dioxide, kaolin or crosslinked polymer particles, for example polystyrene or acrylate particles. The antiblocking agents are preferably added to the top layer(s).

If desired, it is also possible to select mixtures of two or more different antiblocking agents or mixtures of antiblocking agents of the same composition, but different particle size. The particles can be added to the polymers of the individual layers of the film in the advantageous concentrations in each case, directly or via masterbatches during extrusion. Antiblocking agent concentrations of from 0 to 10% by weight (based on the weight of the respective layer) have proven particularly suitable. A detailed description of the antiblocking agents is given, for example, in EP-A-0 602 964.

The total thickness of the film can vary within broad limits and depends on the intended application. The preferred embodiments of the film according to the invention have total thicknesses of from 4 to 200 µm, preferably from 8 to 150 µm, particularly preferably from 10 to 100 µm. The thickness of any interlayer(s) present is generally in each case, independently of one another, from 0.5 to 15 µm, where interlayer thicknesses of from 1 to 10 µm, in particular from 1 to 8 µm, are preferred. The stated values are in each case based on one interlayer. The thickness of the second top layer(s) is selected independently of the other layers and is preferably in the range from 0.1 to 5 µm, in particular from 0.2 to 3 µm, where the second top layers may be different from the first top layer with respect to thickness and composition. The thickness of the base layer arises correspondingly from the difference between the total thickness of the film and the thickness of the top layer(s) and interlayer(s) applied and can therefore vary within broad limits analogously to the total thickness.

The invention furthermore relates to a process for the production of the multilayer film according to the invention by the extrusion or coextrusion process, which is known per se.

In this process, the melt(s) corresponding to the layers of the film are coextruded through a flat-film die, the resultant multilayer film is taken off over one or more roll(s) for solidification, the film is subsequently biaxially stretched (oriented), and the biaxially stretched film is heat-set and, if desired, corona- or flame-treated on the surface layer intended for the treatment.

The biaxial stretching is generally carried out sequentially. This stretching is preferably carried out firstly in the longitudinal direction (i.e. in the machine direction,=MD direction) and subsequently in the transverse direction (i.e. perpendicular to the machine direction,=TD direction). This results in orientation of the molecule chains. The stretching in the longitudinal direction is preferably carried out with the aid of two rolls running at different speeds corresponding to the target stretching ratio. The transverse stretching is generally carried out using a corresponding tenter frame.

The further description of the film production uses the example of flat-film extrusion with subsequent sequential stretching.

The melt(s) are forced through a flat-film die (slot die), and the extruded film is taken off over one or more take-off rolls at a temperature of from 10 to 100° C., preferably from 20 to 80° C., during which it cools and solidifies.

The resultant film is then stretched longitudinally and transversely to the extrusion direction. The longitudinal stretching is preferably carried out at a temperature of from 40 to 150° C., preferably from 60 to 120° C., advantageously with the aid of two rolls running at different speeds corresponding to the target stretching ratio, and the transverse stretching is preferably carried out at a temperature of from 50 to 150° C., preferably from 70 to 120° C., with the aid of a corresponding tenter frame. The longitudinal stretching ratios can be varied in the range from 1.5 to 8. In the production of films having a COC-containing base layer, a higher longitudinal stretching ratio of from 3 to 6 is preferred, whereas films having a transparent base layer are preferably stretched in the range from 1.5 to 3.5. The transverse stretching ratios are in the range from 3 to 10, preferably from 4 to 7.

The stretching of the film is followed by heat-setting (heat treatment) thereof, during which the film is held at a temperature of from 60 to 150° C. for from about 0.1 to 10 seconds. The film is subsequently wound up in a conventional manner using a wind-up device.

It has proven particularly advantageous to incorporate the glycerol fatty acid ester into the top layer of the film via a concentrate. It has been found that the distribution of the esters in the top layer is more uniform and the antistatic properties as a whole are better than in the case of direct incorporation. The concentrates may be based on comparable lactic acid polymers. If desired, the use of mixtures of polyolefins, such as polypropylene or polyethylene, and GFA, which comprise GFA in an amount of from 20 to 60% by weight, based on the batch, is also possible.

If desired, the film can be coated in order to adjust further properties. Typical coatings are adhesion-promoting, slip-improving or dehesive coatings. These additional layers can, if desired, be applied by in-line coating by means of aqueous dispersions before the transverse stretching or off-line.

The film according to the invention is distinguished by very good antistatic properties. This enables good handling of the film during production, winding and processing. In addition, transparent embodiments of the film according to the invention have very good transparency, which, surprisingly, is not impaired by the addition of the large amounts of GFA to the top layer. In addition, it has been found that problems due to deposition or evaporation of the antistatic additive do not occur during production of the film. Problems of this type are known, for example, in the case of the use of GMA in polypropylene films. They do not occur in the production process according to the invention. In addition, it has been found that the films have good antistatic properties even immediately after production and remain stable over time. This is also a clear advantage over films whose antistatic properties only become established after migration processes have occurred. It has been found that the addition of GMA reduces the specific surface resistance of the film compared with the corresponding specific surface resistance of PLA. The specific surface resistance is, in accordance with the invention, below $10^{12}$ $\Omega$/m. Furthermore, the film exhibits good, i.e. low, sliding friction, which has an additional favourable effect on the running and processing properties.

The following measurement values were used to characterize the raw materials and the films:

Antistatic properties: measurement of the surface resistance in accordance with DIN 53482 and the electrical chargeability in accordance with DIN 57303.

Light Transmission

The light transmission is measured in accordance with ASTM-D 1033-77.

The invention is explained below with reference to working examples.

EXAMPLE 1

A transparent three-layer PLA film having a thickness of about 20 μm was produced by extrusion and subsequent stepwise orientation in the longitudinal and transverse directions. The base layer consisted of virtually 100% by weight of a polylactic acid having a melting point of about 60° C. The layer additionally comprised stabilizers and neutralizers in conventional amounts. The top layers, whose thickness was about 2 μm, comprised 2% by weight of GMA as additive in addition to PLA. The production conditions in the individual process steps were as follows:

| Extrusion: | Temperatures | 170–200° C. |
|---|---|---|
| | Temperature of the take-off roll: | 60° C. |
| Longitudinal stretching: | Temperature: | 68° C. |
| | Longitudinal stretching ratio: | 2.0 |
| Transverse stretching: | Temperature: | 88° C. |
| | Transverse stretching ratio (effective): | 5.5 |
| Setting: | Temperature: | 75° C. |
| | Convergence: | 5% |

In this way, a transparent film having characteristic gloss and a reduced specific surface resistance of about $3*10^{12}$ $\Omega/m^2$ and a COF of 0.25 was obtained.

EXAMPLE 2

A three-layer film was produced as described in Example 1, but having a thickness of 30 μm. The GMA content in the top layer here was increased to about 2.5% by weight, based on the top layer. In this way, a transparent film having characteristic gloss, a reduced specific surface resistance and improved coefficient of sliding friction (COF=0.3) was likewise obtained.

COMPARATIVE EXAMPLE 1

(Film without GMA)

A film was produced as described in Example 1. In contrast to Example 1, the film comprised no GMA in the top layers and consisted of about 100% by weight of PLA. This film exhibited neither good antistatic properties (specific surface resistance <$10^{14}$ $\Omega/m^2$), nor an improved coefficient of sliding friction (COF=0.55).

COMPARATIVE EXAMPLE 2

(Film Comprising Less than 2% by Weight of DMA)

A film was produced as described in Example 1. In contrast to Example 1, the film comprised only 1.5% by weight of GMA in a top layer and likewise exhibited poor antistatic properties. The coefficient of sliding friction is only insignificantly lower compared to the film without GMA (COF=0.5).

COMPARATIVE EXAMPLE 3

(Film with a Different Antistatic)

A film was produced as described in Example 1. In contrast to Example 1, the film comprised 2% by weight, based on the weight of the top layer, of a tertiary aliphatic amine (Armostat 300) as antistatic. As in Comparative Example 1, the use of this additive, even if the concentration is increased to 5% by weight in the top layer in the range up to 5% by weight, did not achieve any effect on the antistatic properties or a reduction in sliding friction.

The invention claimed is:

1. Multilayer biaxially oriented film comprising a coextruded multilayer structure comprising a base layer and at least one top layer, wherein the top layer comprises at least one polymer made from at least one hydroxycarboxylic acid and from 2 to 10% by weight of a glycerol fatty acid ester ("GFA") based on the weight of the top layer and wherein the base layer does not contain any GFA.

2. The film according to claim 1, wherein the GFA content is from 2 to 8% by weighs based on the weight of the top layer.

3. The films according to claim 2, wherein the top layer has a thickness from 0.5 to 10 μm and comprises from 80 to < 98% by weight of a polymer made from alipbatic hydroxycarboxylic acid.

4. The film according to claim 3, wherein the aliphatic hyciroxycarboxylic acid is a polyactic acid ("PLA").

5. The film according to claim 4, wherein the glycerol fatty acid ester is a glycerol monocarboxylic acid ester, a glycerol dicarboxylic acid ester or a glycerol tricarboxylic acid ester.

6. The film according to claim 5, wherein the fatty acid of the glycerol fatty acid ester is a stearic acid.

7. The film according to claim 6, wherein the base layer is transparent and comprises from 90 to < 100% by weight of a polylactic acid.

8. The film according to claim 7, wherein the base layer is opaque and additionally comprises an opacifying amount of a cycloolefin copolymer ("COC").

9. The films according to claim 1, wherein the top layer has a thickness from 0.5 to 10 μm.

10. The films according to claim 1, wherein the top layer comprises from 80 to < 98% by weight of a polymer made from ahiphatic hydroxycarboxylie acid.

11. The film according to claim 1, wherein the aliphatic hydroxycarboxylic acid is a polylactic acid ("PLA").

12. The film according to claim 1, wherein the glycerol fatty acid ester is a glycerol monocarboxylic acid ester, a glycerol dicarboxylic acid ester or a glycerol tricarboxylic acid ester.

13. The film according to claim 12, wherein the fatty acid of the glycerol fatty acid ester is a stearic acid.

14. The film according to claim 1, wherein the base layer is transparent and comprises from 90 to < 100% by weight of a polyhydroxycarboxylic acid.

15. The film according to claim 1, wherein the base layer is opaque and additionally comprises an opacifying amount of a cycloolefin copolymer ("COC").

16. The film as claimed in claim 1, wherein the film is a packaging film.

17. A process tr the production of the film according to claim 1, which comprises incorporating the glycerol fatty acid ester into the top layer via a concentrate.

18. The film according to claim 17, wherein the GFA content is from 2 to 8% by weight based on the weight of the top layer and the top layer has a thickness from 0.5 to 10 μm.

* * * * *